(12) United States Patent
Singer et al.

(10) Patent No.: US 11,871,190 B2
(45) Date of Patent: Jan. 9, 2024

(54) SEPARATING SPACE-TIME SIGNALS WITH MOVING AND ASYNCHRONOUS ARRAYS

(71) Applicant: The Board of Trustees of the University of Illinois, Urbana, IL (US)

(72) Inventors: Andrew C. Singer, Champaign, IL (US); Ryan M. Corey, Glen Ellyn, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 196 days.

(21) Appl. No.: 17/622,038

(22) PCT Filed: Jul. 2, 2020

(86) PCT No.: PCT/US2020/040603
§ 371 (c)(1),
(2) Date: Dec. 22, 2021

(87) PCT Pub. No.: WO2021/003334
PCT Pub. Date: Jan. 7, 2021

(65) Prior Publication Data
US 2022/0272445 A1 Aug. 25, 2022

Related U.S. Application Data

(60) Provisional application No. 62/870,504, filed on Jul. 3, 2019.

(51) Int. Cl.
*H04R 3/00* (2006.01)
*G10L 21/0216* (2013.01)
*G10L 21/0208* (2013.01)

(52) U.S. Cl.
CPC .......... *H04R 3/005* (2013.01); *G10L 21/0216* (2013.01); *G10L 2021/02087* (2013.01);
(Continued)

(58) Field of Classification Search
CPC .............. H04R 3/005; H04R 2227/003; H04R 2430/20; G10L 21/0216; G10L 2021/02087; G10L 2021/02166
(Continued)

(56) References Cited

U.S. PATENT DOCUMENTS 8,064,617 B2 11/2011 Buck et al.
8,068,554 B2 11/2011 Lin
(Continued)

FOREIGN PATENT DOCUMENTS

EP 2696599 A2 12/2014
JP 4409634 B2 2/2010

OTHER PUBLICATIONS

Corey et al.: "Speech Separation Using Partially Asynchronous Microphone Arrays Without Resampling", 2018 16th International Workshop on Acoustic Signal Enhancement (IWAENC), IEEE, Sep. 17, 2018, pp. 111-115. (Year: 2018).*

(Continued)

*Primary Examiner* — Paul Kim
(74) *Attorney, Agent, or Firm* — Sunstein LLP

(57) ABSTRACT

A method for separating sound sources includes digitizing acoustic signals from a plurality of sources with a plurality of microphone arrays, wherein each of microphone arrays includes one or more microphones, wherein at least one of the microphone arrays may be asynchronous to another one of the microphone arrays or may be moving with respect to another one of the microphone arrays. Spatial parameters are estimated of the digitized acoustic signals. The method includes estimating time-varying source spectra for the sources from the digitized acoustic signals as a function of the digitized acoustic signals and data received from at least one other microphone array. Source signals are estimated for one or more of the sources by filtering the digitized acoustic
(Continued)

data digitized at the respective microphone array using the spatial parameters of the digitized acoustic data and the time-varying source spectra from all or a subset of the microphone arrays.

33 Claims, 6 Drawing Sheets

(52) U.S. Cl.
CPC .............. *G10L 2021/02166* (2013.01); *H04R 2227/003* (2013.01); *H04R 2430/20* (2013.01)

(58) Field of Classification Search
USPC ....................................................... 381/94.1
See application file for complete search history.

(56) References Cited

U.S. PATENT DOCUMENTS

| | | | |
|---|---|---|---|
| 8,180,069 | B2 | 5/2012 | Buck et al. |
| 8,194,872 | B2 | 6/2012 | Buck et al. |
| 8,965,774 | B2 | 2/2015 | Eppolito |
| 9,338,563 | B2 | 5/2016 | Xia et al. |
| 9,924,283 | B2 | 3/2018 | Fitz |
| 10,141,009 | B2 | 11/2018 | Khoury et al. |
| 10,623,212 | B2 | 4/2020 | Singer |
| 2007/0087756 | A1 | 4/2007 | Hoffberg |
| 2008/0273683 | A1 | 11/2008 | Cohen et al. |
| 2009/0135033 | A1 | 5/2009 | Huppertz |
| 2009/0190769 | A1 | 7/2009 | Wang et al. |
| 2010/0166199 | A1 | 7/2010 | Seydoux |
| 2011/0140942 | A1 | 6/2011 | Pagnanelli |
| 2012/0310637 | A1 | 12/2012 | Vitte et al. |
| 2013/0322276 | A1 | 12/2013 | Pelletier |
| 2014/0244245 | A1 | 8/2014 | Parrot |
| 2015/0229353 | A1* | 8/2015 | Berthelsen ............... H04B 3/23 379/406.08 |
| 2018/0350379 | A1 | 12/2018 | Wung et al. |
| 2019/0132030 | A1 | 5/2019 | Erez |
| 2019/0149163 | A1 | 5/2019 | Bohannon |

OTHER PUBLICATIONS

European Patent Office; Extended European Search Report issued for EP Application No. 20835023.1 dated Jun. 22, 2023 (10 pages).
Halsig et al.; "Spatial Oversampling in LOS MIMO Systems with 1-Bit Quantization at the Receiver," Institute for Communications Engineering, Universität der Bundeswehr München, Germany, Feb. 10, 2017 (6 pages).
Corey et al.; "Spatial Sigma-Delta Signal Acquisition for Wideband Beamforming Arrays," WSA 2016; 20th International ITG Workshop on Smart Antennas, Mar. 9, 2016 (7 pages).
Yilmaz; "Coarse quantization of highly redundant time-frequency representations of square-integrable functions," Applied and Computational Harmonic Analysis, vol. 14, pp. 107-132, Mar. 7, 2003.
Schreier et al.; "Understanding Delta-Sigma Data Converters," IEEE Press, A John Wiley & Sons, Inc. Publication, Wiley, 2005 (455 pages).
Geerts et al.; "Design of Multi-bit Delta-Sigma A/D Converters," Springer, 2006 (238 pages).
Yeang et al.; "Dense transmit and receive phased arrays," Proc. of the IEEE Int. Symp. on Phased Arrays pp. 934-939, (2004).
Scholnik et al.; "Spacio-temporal delta-sigma modulation for shared wideband transmit arrays," Proc. IEEE Radar Conf., pp. 85-90 (2004).
Barac et al.; "Spatial sigma-delta modulation in a massive MIMO cellular system," Master's thesis, Chalmers University of Technology and the University of Gothenburg, 68 pages (2016).
Van Trees; "Optimum Array Processing," Chapter 6, pp. 428-709, Wiley (2002).
Corey et al.; "Speech Separation Using Partially Asynchronous Microphone Arrays Without Resampling", 2018 16th International Workshop on Acoustic Signal Enhancement (IWAENC), IEEE, Sep. 17, 2018 (5 pages).
Sekiguchi et al.; Optimizing the layout of multiple mobile robots for cooperative sound source separation, 2015 IEEE/RSJ International Conference on Intelligent Robots and Systems (IROS), IEEE, Sep. 28, 2015, pp. 5548-5554.
Souden et al,; "Distributed microphone array processing for speech source separation with classifier fusion" Machine Learning for Signal Processing (MLSP), 2012 IEEE International Workshop on, IEEE, Sep. 23, 2012 (6 pages).
Chiba et al.; "Amplitude-based speech enhancement with nonnegative matrix factorization for asynchronous distributed recording", 2014 14th International Workshop on Acoustic Signal Enhancement (IWAENC), IEEE, Sep. 8, 2014, pp. 203-207.
Liu; "Sound Source Separation With Distributed Microphone Arrays in the Presence of Clock Synchronization Errors", Proceedings of the 11th International Workshop on Acoustic Echo and Noise Control (IWAENC), Sep. 14, 2008, pp. 1-4.
USPTO as the International Searching Authority, Authorized Officer: Blaine R. Copenheaver, International Search Report and Written Opinion of the International Searching Authority, PCT/US2O/40603, dated Sep. 30, 2020, 14 pages.

* cited by examiner

SEPARATING SPACE-TIME SIGNALS WITH MOVING AND ASYNCHRONOUS ARRAYS

RELATED APPLICATIONS

The present application is the national phase entry under 35 U.S.C. § 371 of Patent Cooperation Treaty Application Serial No. PCT/US2020/040603, entitled "Separating Space-Time Signals with Moving and Asynchronous Arrays" and filed on Jul. 2, 2020, which claims priority to U.S. Provisional Patent Application Ser. No. 62/870,504, entitled "Separating Space-Time Signals with Moving and Asynchronous Arrays" and filed on Jul. 3, 2019, each of which is incorporated by reference herein in its entirety.

TECHNICAL FIELD

The present invention relates to source separation without resampling, and more particularly to methods and systems for separating space-time signals with moving and asynchronous microphone arrays.

BACKGROUND ART

Microphone arrays are useful for separating and enhancing audio signals because they can isolate sound sources coming from different directions. Over the last few years, microphones have become ubiquitous in consumer electronic devices such as mobile phones, hearing aids and other listening devices, computers, gaming systems, and smart speakers. If many distributed microphones were combined into a single ad hoc array, they would provide greater spatial resolution and therefore better separation performance than any one of the devices alone. Microphones on different devices are sampled at slightly different rates due to hardware variations. Alternatively or in addition, microphone arrays on different devices may move with respect to each other. Although negligible in most applications, these offsets can be critical in array processing, which relies on precise phase relationships between microphones. Several asynchronous array processing methods have been proposed in the literature. Some systems first estimate the sample rate offsets and resample the signals to a common rate. The resampled signals can then be combined coherently using conventional array processing techniques. Unfortunately, existing sample rate estimation algorithms are known to work poorly for moving sources and often do not work at all for moving microphones. In other systems, the sources are separated using single-channel masks that do not require resampling, but also do not take full advantage of the spatial diversity afforded by arrays. To separate sources in the most challenging environments, new asynchronous source separation techniques are needed that do not require resampling and that scale well to devices with many microphones.

SUMMARY OF THE EMBODIMENTS

The deficiencies of the prior art are overcome by performing multi-microphone source separation without resampling using partially asynchronous microphone arrays. In partially asynchronous microphone arrays, some of the microphones do share a common sample clock but others do not. As microphones have become smaller and less expensive, many devices now include at least two. This partial synchronization allows for performing multi-microphone source separation without resampling. In an embodiment of the invention, each device applies a separate linear time-varying spatial filter to the signals collected by its local microphone array. The filter coefficients are computed using information about the source statistics from the full distributed array. For speech and other sparse signals, this shared information can take the form of source activity probabilities computed using spatial features from each array.

In addition to partially asynchronous microphone arrays, the embodiments described herein can be used on moving (or deformable) arrays, and on arrays that are both partially asynchronous and moving/deformable. For asynchronous arrays, the embodiments allow for source separation without resampling. For moving/deformable arrays, the embodiments allow for source separation without explicit motion compensation. In addition, the embodiments described herein can be used to achieve source separation for arrays that are neither moving nor partially asynchronous.

In accordance with one embodiment of the invention, a method for separating sound sources includes digitizing acoustic signals from a plurality of sources with a plurality of microphone arrays, wherein each of the plurality of microphone arrays includes one or more microphones. The method also includes, at each of the plurality of microphone arrays, sending first data to a processing node. The method further includes estimating spatial parameters of the digitized acoustic signals. The method further includes estimating a plurality of time-varying source spectra for the plurality of sources from the digitized acoustic signals as a function of the received first data. The method also includes estimating source signals for one or more of the plurality of sources by filtering the digitized acoustic signals digitized at the microphone arrays using the spatial parameters of the digitized acoustic signals and the plurality of time-varying source spectra from all of the plurality of microphone arrays.

Alternatively or in addition, at least one of the plurality of microphone arrays is asynchronous to another one of the plurality of microphone arrays. Alternatively or in addition, one or more of the plurality of microphone arrays include a plurality of synchronous microphones. In accordance with another embodiment of the invention, the first data includes digitized acoustic signals. In accordance with yet another embodiment of the invention, the first data includes features derived from the digitized acoustic signals In certain other embodiments of the invention, at least one microphone array of the plurality of microphone arrays moves relative to the other microphone arrays during the digitizing of the acoustic signals. In a related embodiment, the estimating of the spatial parameters further includes compensating for motion using a space-time statistical model.

In accordance with a further embodiment of the invention, at least one microphone array of the plurality of microphone arrays has a different number of microphones than another microphone array of the plurality of microphone arrays.

In yet other embodiments of the invention, the method further includes selecting a source signal to isolate a single source from the plurality of sources. In another embodiment, the method further includes filtering the digitized acoustic signals to reduce a volume, or otherwise reduce the contribution, of at least one diffuse noise source.

In another embodiment of the invention, the estimating the plurality of time-varying source spectra is performed at at least one of the microphone arrays of the plurality of microphone arrays and the method further includes transmitting all or a subset of the plurality of time-varying source spectra from the at least one of the microphone arrays in the plurality of microphone arrays to all or a subset of the other microphone arrays in the plurality of microphone arrays, In yet another embodiment of the invention, the estimating the plurality of time-varying source spectra is performed at each of the microphone arrays of the plurality of microphone arrays.

Alternatively or in addition, the method further includes combining the estimated source signals to result in at least one combination of the source signals. In a related embodiment, the combining results in a plurality of different combinations of the source signals.

Alternatively or in addition, the estimating of spatial parameters is performed at each microphone array of the plurality of microphone arrays as a function of the digitized acoustic signals digitized at said each microphone array and the received first data from the other arrays in the plurality of microphone arrays.

In yet another embodiment of the invention, the method further includes driving a speaker with one or more of the estimated source signals to provide an acoustic representation of the one or more of the estimated source signals. Alternatively or in addition, the speaker is located in a hearing aid.

In accordance with an alternative embodiment of the invention, a system for separating sound sources includes a plurality of nodes on a network wherein each of the nodes has a microphone array and a processor configured to digitize acoustic signals from a plurality of sources with the microphone array. The processor is further configured to estimate spatial parameters of the digitized acoustic signals. The processor is also configured to transmit first data to at least one other node of the plurality of nodes and to receive second data from at least one other node of the plurality of nodes. The processor may also be configured to receive estimated spatial parameters from a master node. The processor is further configured to estimate a plurality of time-varying source spectra for the plurality of sources from the digitized acoustic signals and from the second data and to estimate one or more source signals for one or more of the plurality of sources by filtering the digitized acoustic signals digitized at the node using the spatial parameters of the digitized acoustic signals and the plurality of time-varying source spectra. The microphone array of each of the plurality of nodes has one or more microphones.

Alternatively or in addition, at least one node of the plurality of nodes is asynchronous to another one of the plurality of nodes. Also alternatively or in addition, one or more nodes of the plurality of nodes include a microphone array having a plurality of synchronous microphones.

In a related embodiment in accordance with the invention, the first data and second data include digitized acoustic signals. In yet another related embodiment in accordance with the invention, the first data and second data include features derived from the digitized acoustic signals.

In a further related embodiment of the invention, at least one of the microphone arrays of the plurality of nodes moves relative to the other microphone arrays during the digitizing of the acoustic signals. Alternatively or in addition, the estimating of the spatial parameters further includes compensating for motion using a space-time statistical model. In yet another related embodiment, at least one microphone array of the plurality of nodes has a different number of microphones than another microphone array of the plurality of nodes.

In a further related embodiment, the processor is further configured to select a source signal to isolate a single source from the plurality of sources. In another related embodiment of the invention, the processor is further configured to filter the digitized acoustic signals to reduce a volume or otherwise reduce the contribution of at least one diffuse noise source.

In another embodiment of the invention, the estimating the plurality of time-varying source spectra is performed at one of the nodes in the plurality of nodes and the processor is further configured to transmit the plurality of time-varying source spectra from the one of the nodes in the plurality of nodes to all other nodes in the plurality of nodes.

In yet another embodiment in accordance with the invention, the estimating the plurality of time-varying source spectra is performed at each of the nodes in the plurality of nodes.

In a related embodiment, the processor is further configured to combine the estimated source signals to result in at least one combination of the source signals. Alternatively or in addition, the combining results in a plurality of different combinations of the source signals.

In an alternative embodiment in accordance with the invention, a method for separating sound sources at a node of a plurality of nodes on a network includes digitizing acoustic signals from a plurality of sources with a microphone array, wherein the microphone array includes one or more microphone. The method further includes estimating spatial parameters of the digitized acoustic signals. The method also includes exchanging first data between the node and at least one other node of the plurality of nodes on the network. The method further includes estimating a plurality of time-varying source spectra for the plurality of sources from the digitized acoustic signals as a function of the digitized acoustic signals from all microphone arrays of the plurality of nodes. The method also includes estimating source signals for each or for a subset of the plurality of sources by filtering the digitized acoustic signals digitized at the node using the spatial parameters of the digitized acoustic signals and the plurality of time-varying source spectra.

Alternatively or in addition, the microphone array is asynchronous to another microphone array of another node on the network.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Source signal" shall refer to the response of a microphone array to a source or to a desired estimate of the sound emitted by a particular source, or to the original signal emitted by a particular source.

"Spatial parameters" of acoustic signals or acoustic data are parameters that depend on the source and microphone array geometry and on room acoustics. One example of such spatial parameters is the frequency-dependent spatial covariance of acoustic signals. Other examples of spatial parameters are acoustic impulse responses or transfer functions, relative impulse responses or transfer functions, spatial covariance or spectral density matrices, geometric coordinates, directions of arrival, and time differences of arrival. For simplicity, it is assumed that the spatial parameters are time-invariant.

"Spectrum" is the frequency domain power spectrum of a signal.

"Network" shall mean any kind of digital network. Such network may be wireless or wired. Examples for digital networks include, but are not limited to, Wi-Fi, Ethernet, Bluetooth, personal area networks such as Zigbee and Z-Wave, and any other network that enables a node to transmit digital data to and receive digital data from other nodes.

"Source separation" shall include spatial signal processing where the output is a set of separate signals for the different sound sources, spatial signal processing where the output is one or more new combinations of the different sound sources with different amplification or other processing applied to each source, and spatial signal processing where the output is a single isolated source or primarily one source with background sources reduced.

A "deformable" array of nodes is an array of nodes in which at least one node can move relative to the other nodes.

Figure 1:
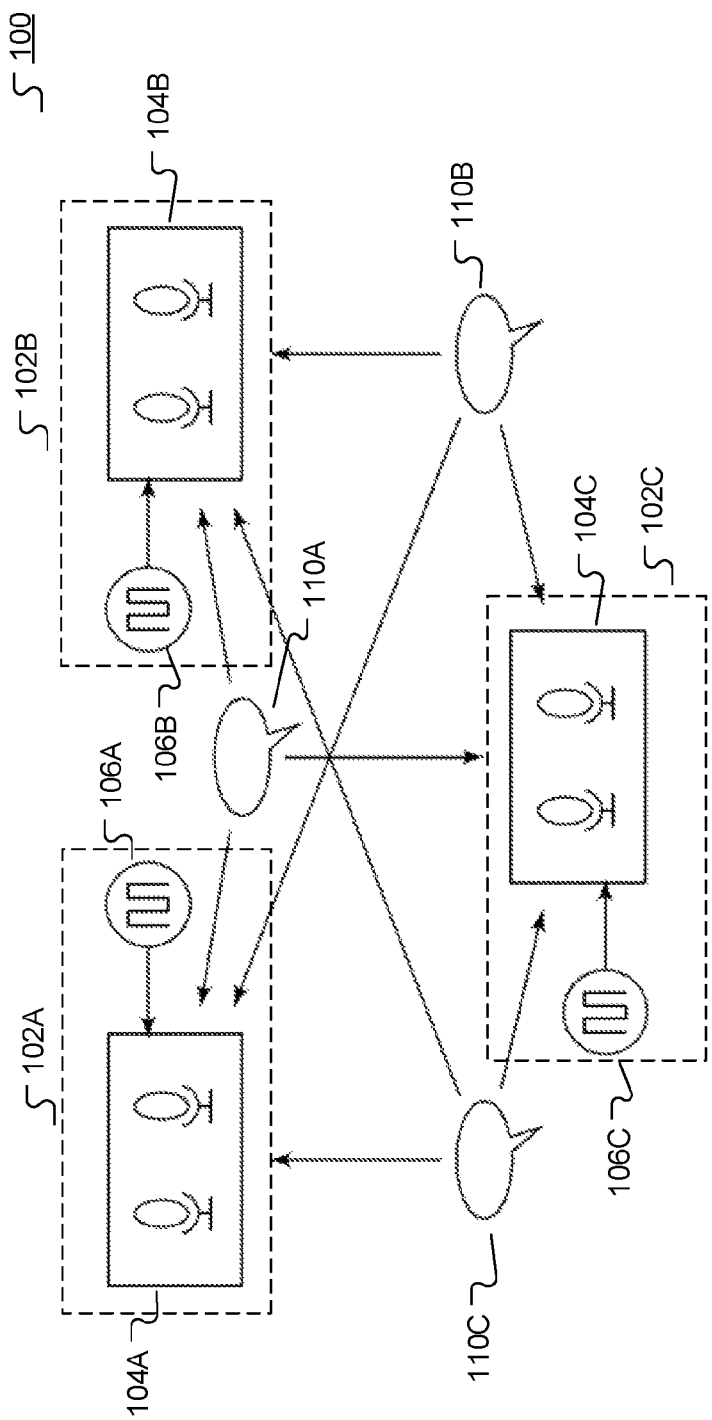
FIG. 1 depicts a system in accordance with an embodiment of the present invention.

FIG. 1 shows a system in accordance with an embodiment of the present invention. System 100 exemplarily includes three devices or nodes 102A-C. It is, however, expressly contemplated that system 100 may have two nodes or more than three nodes. Each node 102A-C further includes a microphone array 104A-C. Each microphone array 104A-C may have one or more microphones. For example, each microphone array 104A-C may have two microphones. Each microphone array 104A-C may also include one microphone or more than two microphones. In addition, there is no requirement that each microphone array 104A-C have the same number of microphones. Therefore, microphone array 104A may, for example, have two microphones, microphone array 104B may have four microphones, and microphone array 104C may have seven microphones. The present invention does not limit the number of microphones each microphone array may have, except that each microphone array should have at least one microphone.

Each node 102A-C further has access to a sample clock 106A-C. The sample clocks 106A-C may be internally generated in the nodes 102A-C. The sample clocks 106A-C may also be generated by an external clock source that is coupled to the nodes 102A-C. The sample clocks 106A-C determine a sample rate at which the nodes 102A-C digitize acoustic signals detected by microphone arrays 104A-C. Acoustic signals are acoustic waves, i.e. pressure waves, and may, for example, be generated by sound sources 110A-C. The sound sources 110A-C may be directional sound sources or they may be diffuse sound or noise sources. The sound sources may exemplarily be speech sources. Therefore, each source 110A-C may be a human speaker uttering speech in a room. The sources 110A-C may also be other kinds of speech sources, such as loudspeakers emitting speech sounds. Further, the sources 110A-C may not be speech sources but sources of other directional or diffuse acoustic signals, such as music or noise. It is expressly contemplated that there may be fewer or more than three sound sources. In addition, not all sound sources need to be of the same type. For example, sources 110A and 110B may be speech sources, while source 110C may be a noise source.

The nodes 102A-C receive the acoustic signals generated by sound sources 110A-C. The microphones in microphone arrays 104A-C then convert the acoustic signals into electric signals corresponding to the acoustic signals. The microphone arrays 104a-C then digitize the electric signal representations of the acoustic signals with a sample rate that corresponds to the respective sample clock 106A-C resulting in digitized acoustic signals. All microphones in each microphone array digitize the acoustic signals at that microphone array using the same sample clock. Therefore, all microphones in microphone array 104A use the same sample rate as determined by sample clock 106A; all microphones in microphone array 104B use the same sample rate as determined by sample clock 106B, etc. Accordingly, the microphones in each microphone array are synchronized with each other, and the digitized acoustic signals that they generate is also synchronized using the same sample rate. However, there is no requirement for synchronization between different microphone arrays. Therefore, the digitized acoustic signals from one microphone array may be asynchronous to the digitized acoustic signals from another microphone array. Even though the desired sample rate may be the same, slight variations between sample clocks of different nodes may mean that the actual sample rates vary slightly. For example, with a desired sample rate of 16 kHz, the actual sample rate of node 102A may be 16.00 kHz, the actual sample rate of node 102B may be 16.01 kHz, and the actual sample rate of node 102C may be 15.99 kHz. While some of the embodiments described herein include at least one asynchronous microphone array, it is not a requirement that at least one microphone array be asynchronous. It is expressly contemplated that all microphone arrays may be synchronized with each other.

The nodes 102A-C also may have a network interface (not shown). Each node may have an interface or similar access device to connect to a wireless or wired digital network. Using that interface, the node can connect to networks such as, but not limited to, Wi-Fi, Ethernet, Bluetooth, personal area networks like Zigbee and Z-Wave, and other available digital networks. The network interface allows the nodes to send and receive data to and from all other nodes in the system. Such data could, for example, be digitized acoustic signals or it could be estimates of time-varying source spectra. Such data could also include log-likelihoods of source activity or other features derived from the digitized acoustic signals. Such data could further include latent parameters that depend on the content of the source signals and are not strongly affected by motion or sample rate offsets. Examples of such latent parameters include cepstral coefficients, activation vectors for a non-negative matrix factorization (NMF) or non-negative tensor factorization (NTF), and latent representations learned by neural networks. It is expressly contemplated that any kind of data could be exchanged between the nodes in the system.

Asynchronous Array Processing

Consider a set of M distributed arrays and let $x_{c,m}(t)$ be the vector of continuous-time signals captured by array m for m=1, . . . , M. The arrays need not have the same number of microphones. If the arrays shared a common sample period T, then the sampled discrete time sequences would be $\tilde{x}_{d,m}[t] = x_{c,m}(\tau T)$ for integer time indices $\tau$. Instead, each array m has its own sample period $T_m$, so that the sampled data vectors are $x_{d,m}[\tau]=x_{c,m}(\tau T_m)$ for m=1, ..., M. The received signals are due to K independent sound sources, so that $$x_{d,m}[\tau]=\Sigma_{k=1}^{K} c_{d,m,k}[\tau] \text{ for } m=1, \ldots, M \quad (1)$$

where $c_{d,m,k}[\tau]$ is the response of array m to source k, which is often called the source signal. The sources may include both directional sound sources and diffuse noise. Our goal is to estimate one or more of the source signals $c_{d,m,k}[\tau]$ from the mixtures $x_{d,1}[\tau], \ldots, x_{d,M}[\tau]$.

Sample Rate Offset Model

Let $c_{m,k}[n, f]$, $\tilde{x}_m[n, f]$, and $x_m[n, f]$ be the short-time Fourier transform (STFT) vectors of the corresponding discrete-time sequences, where n is the frame index and f is the frequency index. Since each microphone array has a different sample rate, the [n, f] indices of each sequence $x_m[n, f]$ correspond to slightly different continuous-time intervals and frequencies. It is assumed that the sample times are coarsely synchronized and that the sample rate offsets are sufficiently small that the sequences $x_{d,m}[\tau]$ are offset from each other by much less than one STFT frame length over the period of interest. The effect of those offsets can be modeled by $$x_m[n, f]=e^{j\alpha_m[n,f]}\tilde{x}_m[n, f] \quad (2)$$

where $\alpha_m[n, f]$ is a phase shift due to the small sample rate offset at array m. Then, assuming that the sequences are zero-mean random processes, the across-array correlations are given by $$E[x_m[n, f]x_l^H[n, f]]=E[e^{j(\alpha_m[n,f]-\alpha_l[n,f])}\tilde{x}_m[n, f] \quad (3)$$

where E denotes expectation and H the Hermitian transpose. If the sample rate offsets are sufficiently small and time-invariant over the period of interest, then each $\alpha_m[n, f]$ is approximately proportional to nf $(T^{-1}-T_m^{-1})$.

If the $\tilde{x}[n, f]$ are approximately stationary over a long time interval, then the relative sample rate offsets can be estimated based on these cross-correlations and the $x_{d,m}[\tau]$ sequences can be resampled to obtain estimates of $\tilde{x}_{d,m}[\tau]$. However, correlation-based methods as in the prior art are known to be sensitive to source motion. Movement of the microphones themselves is fatal, since sample rate offsets and constant-velocity motion induce nearly identical linear phase shifts. These prior art methods work well when the microphones are stationary, even if they are far apart, but they fail when one microphone moves relative to the other. Thus, these prior art algorithms are poorly suited to cocktail party scenarios with microphones worn or carried by moving humans.

Here, a worst-case scenario is shown in which little is known about the phase offsets between microphone arrays. In particular, model each $\alpha_m[n, f]$ is modeled as an independent random variable uniformly distributed from $-\pi$ to $\pi$. Under this model, since $E[e^{j\alpha_m[n,f]}]=0$, by linearity of expectation we have $$E[x_m[n, f]x_l^H[n, f]]=0 \text{ for } m \neq l. \quad (4)$$

The captured sequences are thus uncorrelated across arrays. Assuming that the source signals are uncorrelated with each other, their linear minimum mean square error estimators are given by the multichannel Wiener filters $$\hat{c}_{m,k}[n, f]=R_{m,k}[n, f](\Sigma_{k=1}^{K}R_{m,k}[n, f])^{-1}x_m[n, f] \quad (5)$$

for m=1, ..., M and k=1, ..., K, where each $R_{m,k}[n, f]=E[c_{m,k}[n, f]c_{m,k}^H[n, f]]$ is the time-varying source signal covariance matrix. Since the signals are due to both directional and diffuse sources, it can be assumed that $E_{m,k}^{K}R_{m,k}[n, f]$ is nonsingular for all m, n, and f. Thus, the linear estimators for the source signals at each array use only the local microphones in that array. If each array has only a few microphones, then these filters might perform quite poorly compared to those for a synchronous distributed array.

Distributed Spatial Filtering

The multichannel Wiener filter (as shown in equation 5 above) is often implemented using time-varying estimates $\hat{R}_{m,k}[n, f]$ of the nonstationary source covariances. Separation algorithms rely on good covariance estimates, and that is where it is advantageous to use asynchronous arrays. Although the sequences $x_m[n, f]$ and $x_l[n, f]$ are uncorrelated for $m \neq l$ due to their assumed-random phase shifts, they are not independent: both are generated by the same set of sources. Thus, the time-varying source statistics can be estimated using information from all M arrays, and then those statistics can be used to create M time-varying spatial filters. An embodiment of this aspect is depicted in FIG. 2.

Figure 2:
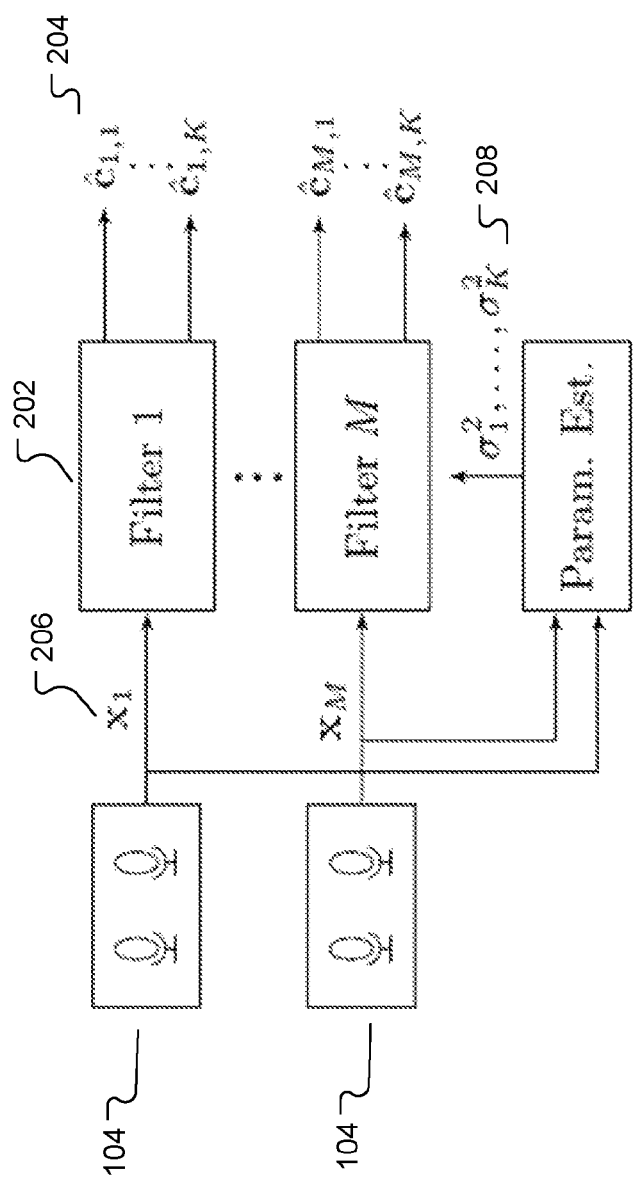
FIG. 2 shows a source separation system in accordance with an embodiment of the present invention.

FIG. 2 shows an embodiment of the present invention with M nodes having microphone arrays 104 and K sources. Each node 104 estimates each source signal 204 at that node using its own time-varying spatial filter 202, for example a multichannel Wiener filter. However, it is expressly contemplated that a node 104 need not estimate all source signals 204. A node 104 also need not estimate any source signal and might only act as a passive sensor. In addition, different nodes 104 may separate different source signals 204. One input to each filter 202 is the estimate of the time-varying source statistics 208 which is computed using information from all M nodes as described below. Another input to each filter are the digitized audio signals 206. As described above, while the time-varying source statistics 208 are combined from all nodes in the system, each node 104 only uses digitized audio signals from its local microphone array to estimate each source signal 204 at that node.

To estimate the time-varying source statistics, a space-time statistical model such as a variant of the full-rank local Gaussian model can be applied, in which it is assumed that each source signal $c_{m,k}[n, f]$ has zero mean and a conditional normal distribution given its covariance $$R_{m,k}[n, f]=\sigma_k^2[n, f]\bar{R}_{m,k}[f] \quad (6)$$

where $\sigma_k^2[n, f]$ is the time-varying source spectrum and $\bar{R}_{m,k}[f]$ is the frequency-dependent spatial covariance, which depends on the source and microphone array geometry and on room acoustics. For simplicity, it is assumed that each $\bar{R}_{m,k}[f]$ is time-invariant and that the full-rank covariance matrix accounts for uncertainty due to motion of the array. Advantageously, the full-rank covariance matrix is used here to compensate for small motion of the array without explicitly tracking it. As is typically done with the local Gaussian model, it is also assumed that the $c_{m,k}[n, f]$ are conditionally independent across n, f and k given the source spectra $\sigma_1^2[n, f], \ldots, \sigma_k^2[n, f]$. Further, conditional independence across m is assumed, which reflects the uncorrelatedness of the array signals from equation (4) above.

Accordingly, an illustrative embodiment of the inventive estimation method may include the following steps:

First, estimate the spatial parameters $\bar{R}_{m,k}[f]$ using any suitable method known to a person skilled in the art. An example of a suitable method based on training is given below, wherein the spatial parameters are estimated using 5-second training clips from the speech sources.

Second, find estimates $\hat{\sigma}_k^2[n, f]$ of the time-varying source spectra $\sigma_k^2[n, f]$ using the observations from all M arrays. An estimator for sparse mixtures is described in detail below.

Third, use the estimated source spectra and spatial parameters in the multichannel Wiener filters from equation (5) above to estimate the source signals at each microphone array:

$$c_{m,k}[n, f] = \hat{\sigma}_k^2[n, f]\overline{R}_{m,k}[f](\Sigma_{s=1}^K \hat{\sigma}_s^2[n, f] \overline{R}_{m,s}[f])^{-1} x_m[n, f] \quad (7)$$

The output of the Wiener filter, the source signals, allow the system to filter the digitized audio signals at each node. For example, a node may select a single source from the source signals to isolate a single speech source and process the speech digitized from that source. A node may also isolate a sound source other than a speech source. Another example may be a node that filters the source signals or the digitized audio signals to lower the volume or otherwise suppress a diffuse noise source detected in the source signals. Exemplarily, a node may also combine the different sound sources with different amplification or other processing applied to each source, or output a set of separate source signals for the different sound sources. The output source signals may be used for further processing, such as for speech processing or speech recognition. The output source signals, or a combination of source signals, may also be used to generate corresponding acoustic signals through a loudspeaker or similar device. Illustratively, using the output source signals to drive speakers in a hearing aid could allow a user to isolate, amplify, or suppress certain sound sources.

Joint Spectral Estimation for Sparse Sources

There are many methods to estimate time-varying source spectra known from the prior art, such as those based on expectation maximization and nonnegative matrix factorization. However, for speech sources, it is advantageous to utilize a classification method that takes advantage of the time-frequency sparsity of speech. The W-disjoint orthogonal model, which is most often used for single-channel methods such as time-frequency masks but has also been applied for underdetermined multi-microphone separation, assumes that for every [n, f], a state s[n, f] ∈ {1, . . . , K} can be assigned such that $\sigma_{s[n,f]}^2[n, f] >> \sigma_k^2[n, f]$ for s[n, f≠k. To account for periods with no active directional sources, the model further includes at least one stationary diffuse noise source.

Let $\sigma_{k|s}^2[f]$ denote the variance of source k at frequency index f when the system is in state s. The variance can then be modeled as taking one of two values for each source, depending on the state:

$$\sigma_{k|s}^2[f] = \begin{cases} \sigma_{k,high}^2[f] & \text{if } k = s \\ \sigma_{k,low}^2[f] & \text{if } k \neq s \end{cases} \quad (8)$$

Typical mask-based systems choose $\sigma_{k,low}^2=0$, but since microphone arrays can steer multiple nulls at once, it is advantageous to include all sources in the model. Here, $\sigma_{k,high}^2[f]$ and $\sigma_{k,low}^2[f]$ are chosen to be respectively 10 dB above and 10 dB below the long-term average source spectrum, which works well for speech sources. The diffuse noise source has the same assumed spectrum in every state, and its magnitude can be tuned to improve the conditioning of the matrices in Equation (7). Exemplarily, the diffuse noise source may have an uncorrelated spectrum similar in power to that of the directional speech sources.

Under the local Gaussian model, the log-likelihood of the observations in state s is given by $$\log p_s[n, f] = -\sum_{m=1}^M x_m^H[n, f]\left(\sum_{k=1}^K \sigma_{k|s}^2[f]\overline{R}_{m,k}[f]\right)^{-1} x_m[n, f] - \sum_{m=1}^M \log \det\left(\pi \sum_{k=1}^K \sigma_{k|s}^2[f]\overline{R}_{m,k}[f]\right)$$

Assuming uniform priors over all states, the posterior probability of state s is given by $$\gamma_s[n, f] = \frac{p_s[n, f]}{\sum_{k=1}^K p_k[n, f]}$$

Finally, the Bayesian estimate of each source power sequence is given by $$\hat{\sigma}_k^2[n, f] = \sum_{s=1}^K \gamma_s[n, f]\sigma_{k|s}^2[f]$$

Application: Cocktail Party Scenario with Moving Wearable Microphone Arrays

An exemplary application of the method described above is a listening enhancement experiment in which microphone arrays are attached to moving human listeners in a cocktail party scenario. In this scenario there are up to eight simultaneous speech sources. Since current blind source separation techniques are poorly suited to such large mixtures, and since the achievable performance of an asynchronous array system is to be demonstrated, measured rather than estimated spatial parameters are used for this application.

Figure 3:
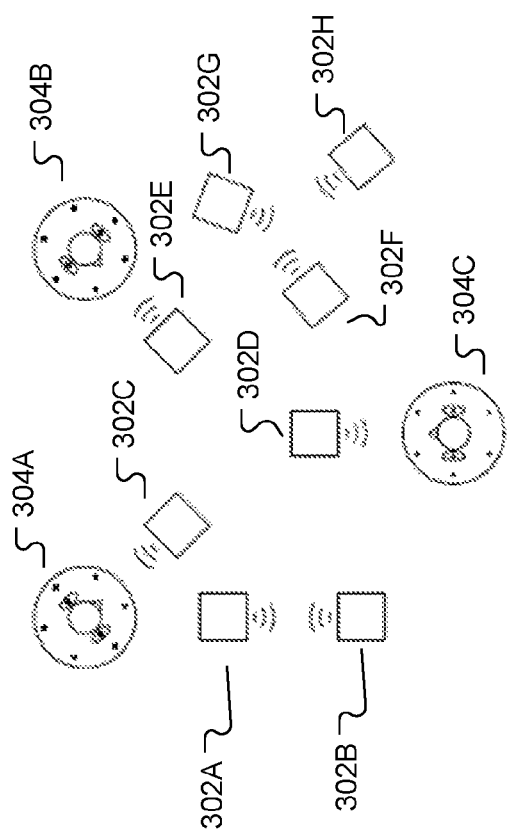
FIG. 3 depicts a sample application of the inventive system and method.

FIG. 3 shows the cocktail party scenario, comprising eight talkers 302A-H, which were simulated using loudspeakers playing clips from a speech database, and three real human listeners 304A-C. Each human listener 304A-C wore a head-mounted array of eight omnidirectional lavalier microphones: one in each ear and six affixed to a rigid, wide-brimmed hat with diameter 60 cm. The listeners moved their heads continuously during the recordings, alternately nodding, looking around the room, and shifting from side to side.

The twenty-four signals were recorded on a single interface, sampled at 16 kHz, and high pass-filtered from 100 Hz to remove low-frequency ambient noise. The recordings were made in a laboratory which has a reverberation time of about $T_{60}$=300 ms. Artificial sample rate offsets of ±0.3 Hz were applied to two arrays using Lagrange interpolation. The STFT was computed with a length-4096 von Hann window and 75% overlap. The spatial covariance matrices $\overline{R}_{m,k}[f]$ were estimated using 5-second training clips from the same talkers and with similar listener motion as the 15-second test clips. Because they are designed for binaural listening devices, the filters produce only the source signal estimates for the microphones in the ears, not for those on the hat. To measure the source signals, the source signals were recorded individually and then superimposed to form a mixture. This procedure allows for measuring the ground truth signal-to-distortion ratio (SDR), but it is physically unrealistic because the human motion is different in every source recording.

Figure 4:
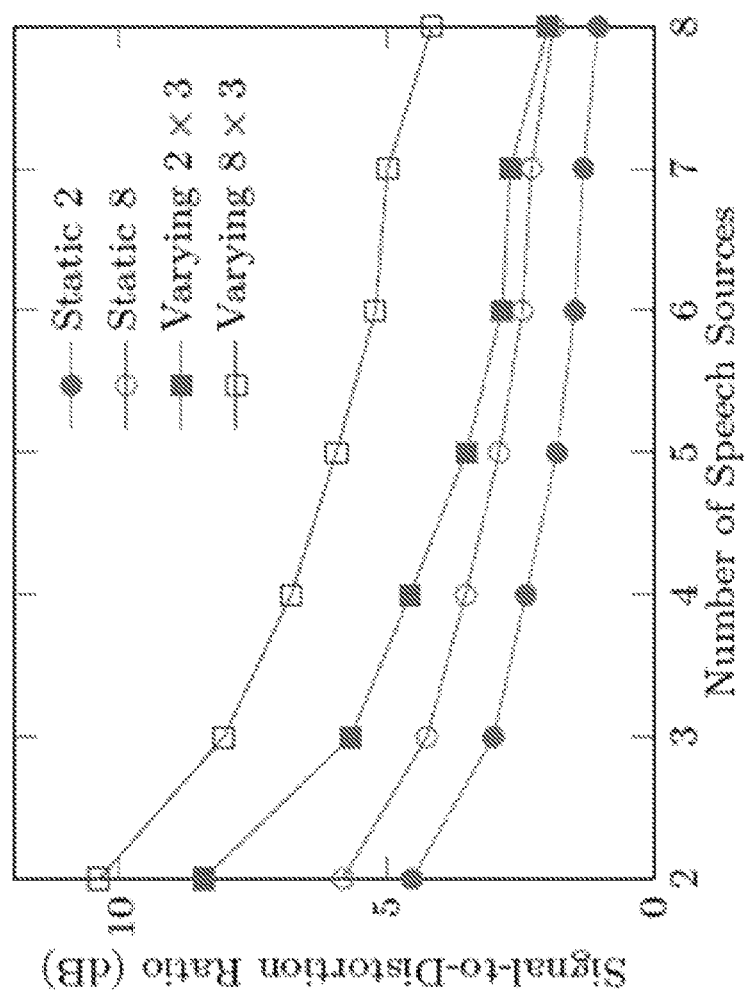
FIG. 4 shows the results of a sample application of the inventive system and method.

FIG. 4 compares the separation performance of four combinations of microphone arrays: a static array of two in-ear microphones, a static array of all eight microphones, a time-varying asynchronous array of two microphones per listener, and a time-varying asynchronous array of eight microphones per listener. The separation performance was determined by the signal-to-distortion ratio:

$$SDR_{m,k} = 10\log_{10} \frac{\sum_\tau |c_{d,m,k}[\tau]|^2}{\sum_\tau |\hat{c}_{d,m,k}[\tau] - c_{d,m,k}[\tau]|^2}$$

It is noteworthy that the distributed array of two microphones per listener outperforms the eight-microphone static array, even when there are eight sources. The distributed classifier as described herein helps to resolve ambiguities between sources that have similar transfer functions to the individual arrays. This is particularly important for moving arrays: when a listener turns their head from side to side, the classifier can use the other two arrays to decide which source they are hearing. This feature requires no explicit modeling of head motion; it is a consequence of the full-rank spatial covariance model and conditional independence between subarrays.

Figure 5:
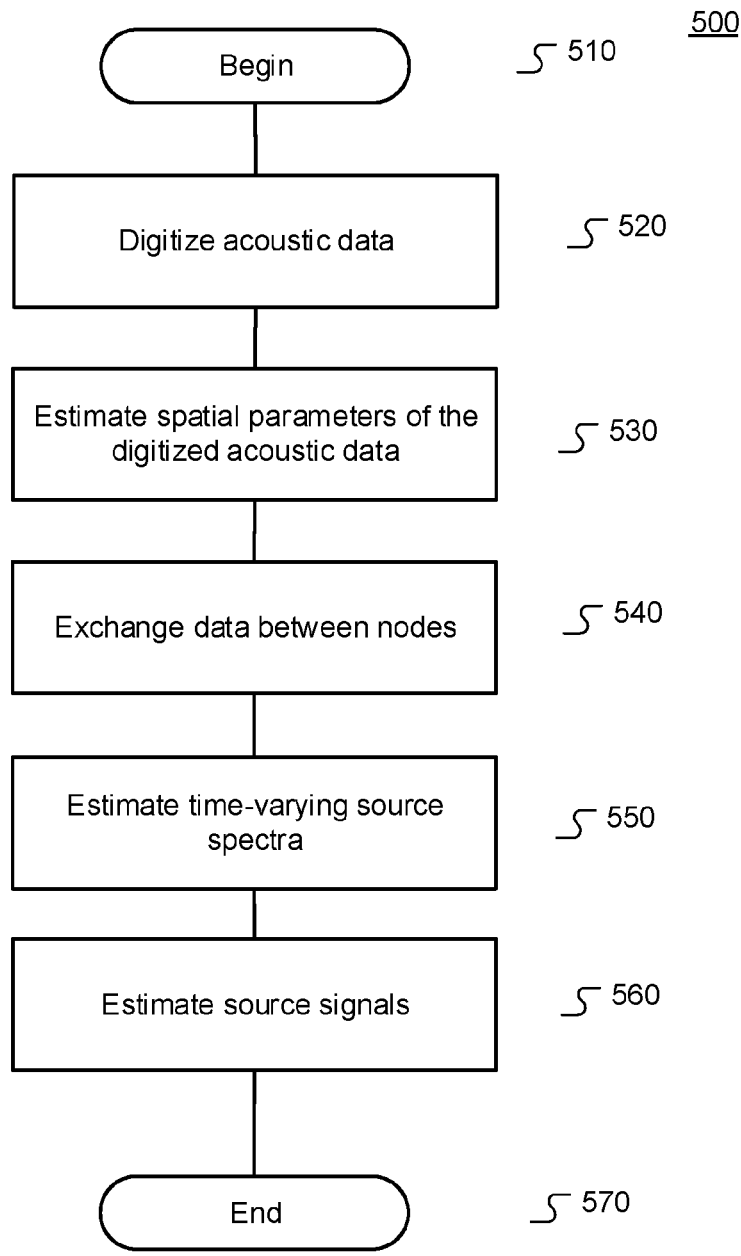
FIG. 5 is a flowchart of a method in accordance with an embodiment of the present invention.

FIG. 5 is a flowchart of a method 500 in accordance with an embodiment of the present invention. The method 500 begins at step 510. It then proceeds to step 520, where microphone arrays in a plurality of nodes digitize acoustic signals from a plurality of sound sources. As discussed in detail above, the sound sources may be speech sources, directional sound sources, or diffuse sound sources such as noise. Each microphone array may contain one or more microphones. If the microphone array contains more than one microphone, the microphones in that microphone array are synchronous. Further, the microphone arrays may be asynchronous with each other.

The method then proceeds to step 530, where spatial parameters of the digitized acoustic signals are estimated for each source. The spatial parameters may be estimated at each node for the acoustic signals digitized by the microphone array at that node. However, it is expressly contemplated that the spatial parameters may be estimated jointly between the nodes or at a master node. The estimation process is described in further detail above.

The method now proceeds to step 540, where the networked nodes exchange data between each other. The data may be the digitized acoustic signals, or the data may be data containing features derived from the digitized acoustic signals. For example, each node may derive log-likelihoods or latent parameters of source activity for each source from the digitized acoustic signals, as described in detail above, and exchange the log-likelihoods or latent parameters with the other nodes. It is expressly contemplated that any data may be exchanged between the networked nodes. It is further expressly contemplated that step 540 may be performed before step 530. For example, if the spatial parameters are estimated jointly between the nodes or at a master node, the networked nodes may exchange data between each other before the spatial parameters are estimated.

In step 550, the time-varying source spectra for each source are estimated. Each networked node may estimate the time-varying source spectra from the combined data generated by it and received from the other nodes in step 540. The node may estimate the time-varying source spectra from digitized audio signals, or it may estimate the time-varying source spectra also making use of log-likelihoods of source activity. In estimating the time-varying source spectra, each network node may use data generated by and received from all networked nodes in the system. The estimation process is described in further detail above.

The method now proceeds to step 560, where at least one networked node estimates source signals from the spatial parameters of the digitized acoustic signals, the time-varying source spectra, and the digitized acoustic signals from that node. A networked node may estimate source signals for all sources. However, it is expressly contemplated that a node need not estimate all source signals. A node also need not estimate any source signals and might only act as a passive sensor. In addition, different networked nodes may separate different source signals. The source signals can, for example, be estimated using multichannel Wiener filters. The estimation process is described in further detail above. As also described above, the estimated source signals may be utilized for further processing, such as speech recognition, or may be used to drive a speaker, such as in a hearing aid. The method ends at step 570.

Figure 6:
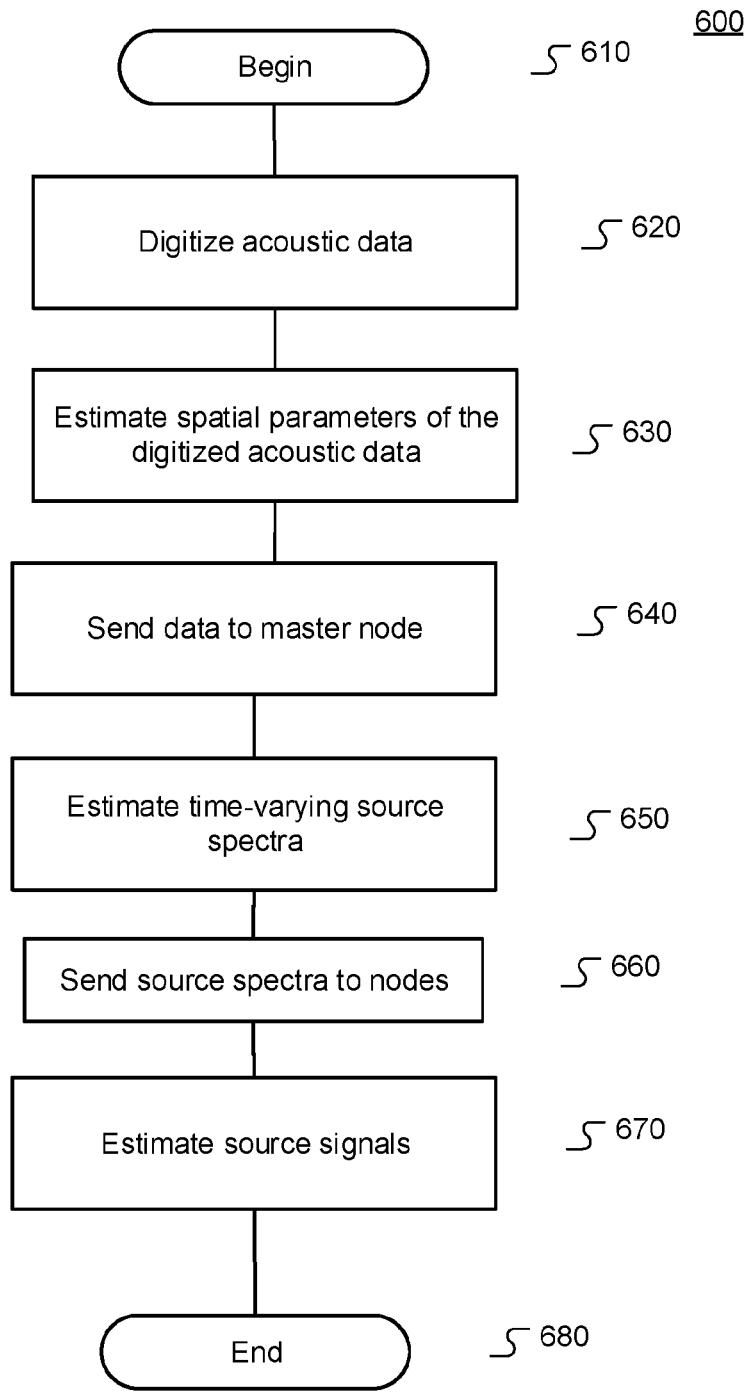
FIG. 6 is a flowchart of a method in accordance with an alternative embodiment of the present invention.

FIG. 6 is a flowchart of a method 600 in accordance with an alternative embodiment of the present invention. The method 600 begins at step 610. It then proceeds to step 620, where microphone arrays in a plurality of nodes digitize acoustic signals from a plurality of sound sources. As discussed in detail above, the sound sources may be speech sources, directional sound source, or diffuse sound sources such as noise. Each microphone array may contain one or more microphones. If the microphone array contains more than one microphone, the microphones in that microphone array are synchronous. Further, the microphone arrays may be asynchronous with each other.

The method then proceeds to step 630, where spatial parameters of the digitized acoustic signals are estimated for each source. The spatial parameters may be estimated at each node for the acoustic signals digitized by the microphone array at that node. However, it is expressly contemplated that the spatial parameters may be estimated jointly between the nodes or at a master node. The estimation process is described in further detail above.

The method now proceeds to step 640, where each node sends data to a master node. The master node may be one of the networked nodes having microphone arrays, or the master node may be a central server or other computer with more processing power than the networked nodes could provide. The data may be the digitized acoustic signals, or the data may be data containing features derived from the digitized acoustic signals. For example, each node may derive log-likelihoods or latent parameters of source activity for each source from the digitized acoustic signals, as described in detail above. It is expressly contemplated that any data may be sent to the master node. It is further expressly contemplated that step 640 may be performed before step 630. For example, if the spatial parameters are estimated at the master node, the nodes may send data to the master node before the spatial parameters are estimated.

In step 650, the time-varying source spectra for each source are estimated at the master node. The master node may estimate the time-varying source spectra from the combined data generated by all nodes and received in step 640. The master node may estimate the time-varying source spectra from digitized audio signals, or it may estimate the time-varying source spectra from log-likelihoods or latent parameters of source activity. In estimating the time-varying source spectra, the master node may use data generated by and received from all networked nodes in the system. The estimation process is described in further detail above.

In step 660, the master node sends the estimated time-varying source spectra to all nodes in the network. Each networked node receives the same time-varying source spectra as they are generated using data from all nodes.

The method now proceeds to step 670, where at least one networked node estimates source signals from the spatial parameters of the digitized acoustic signals, the time-varying source spectra received from the master node, and the digitized acoustic signals from the respective networked node. A networked node may estimate source signals for all sources. However, it is expressly contemplated that a node need not estimate all source signals. A node also need not estimate any source signal and might only act as a passive sensor. In addition, different networked nodes may separate different source signals. The source signals can, for example, be estimated using multichannel Wiener filters. The estimation process is described in further detail above. As also described above, the estimated source signals may be utilized for further processing, such as speech recognition, or may be used to drive a speaker, such as in a hearing aid. The method ends at step 680.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for separating sound sources, the method comprising:
    digitizing acoustic signals from a plurality of sources with a plurality of microphone arrays,
        wherein each of the plurality of microphone arrays comprises one or more microphones;
    at each of the plurality of microphone arrays, sending first data to a processing node;
    estimating spatial parameters of the digitized acoustic signals;
    estimating a plurality of time-varying source spectra for the plurality of sources from the digitized acoustic signals as a function of the received first data; and
    estimating source signals for one or more of the plurality of sources by filtering the digitized acoustic signals digitized at the microphone arrays using the spatial parameters of the digitized acoustic signals and the plurality of time-varying source spectra from all of the plurality of microphone arrays.

2. The method of claim 1, wherein at least one of the plurality of microphone arrays is asynchronous to another one of the plurality of microphone arrays.

3. The method of claim 1, wherein the first data comprises digitized acoustic signals.

4. The method of claim 1, wherein the first data comprises features derived from the digitized acoustic signals.

5. The method of claim 1, wherein at least one microphone array of the plurality of microphone arrays moves relative to the other microphone arrays during the digitizing of the acoustic signals.

6. The method of claim 5, wherein the estimating of the spatial parameters further comprises compensating for motion using a space-time statistical model.

7. The method of claim 1, wherein at least one microphone array of the plurality of microphone arrays comprises a different number of microphones than another microphone array of the plurality of microphone arrays.

8. The method of claim 1, wherein the method further comprises selecting a source signal to isolate a single source from the plurality of sources.

9. The method of claim 1, wherein the method further comprises filtering the digitized acoustic signals to reduce a volume or the contribution of at least one diffuse noise source.

10. The method of claim 1, wherein the estimating the plurality of time-varying source spectra is performed at one of the microphone arrays of the plurality of microphone arrays and wherein the method further comprises transmitting the plurality of time-varying source spectra from the one of the microphone arrays of the plurality of microphone arrays to all or to a subset of the other microphone arrays in the plurality of microphone arrays.

11. The method of claim 1, wherein the estimating the plurality of time-varying source spectra is performed at each or a subset of the microphone arrays of the plurality of microphone arrays.

12. The method of claim 1, wherein the method further comprises combining the estimated source signals to result in at least one combination of the source signals.

13. The method of claim 12, wherein the combining results in a plurality of different combinations of the source signals.

14. The method of claim 1, wherein one or more of the plurality of microphone arrays comprise a plurality of synchronous microphones.

15. The method of claim 1, wherein the estimating of spatial parameters is performed at each microphone array of the plurality of microphone arrays as a function of the digitized acoustic signals digitized at said each microphone array and the received first data from the other arrays in the plurality of microphone arrays.

16. The method of claim 1, further comprising driving a speaker with one or more of the estimated source signals to provide an acoustic representation of the one or more of the estimated source signals.

17. The method of claim 16, wherein the speaker is located in a hearing aid.

18. A system for separating sound sources comprising:
    a plurality of nodes on a network, each of the plurality of nodes comprising a microphone array and a processor configured to:
        digitize acoustic signals from a plurality of sources with the microphone array;
        estimate spatial parameters of the digitized acoustic signals;
        transmit first data to at least one other node of the plurality of nodes;
        receive second data from at least one other node of the plurality of nodes;
        estimate a plurality of time-varying source spectra for one or more of the plurality of sources from the digitized acoustic signals and from the second data; and
        estimate one or more source signals for one or more of the plurality of sources by filtering the digitized acoustic signals digitized at the node using the spatial parameters of the digitized acoustic signals and the plurality of time-varying source spectra,
    wherein the microphone array of each of the plurality of nodes comprises one or more microphone.

19. The system of claim 18, wherein at least one of the plurality of nodes is asynchronous to another one of the plurality of nodes.

20. The system of claim 18, wherein the first data and second data comprise digitized acoustic signals.

21. The system of claim 18, wherein the first data and second data comprise features derived from the digitized acoustic signals.

22. The system of claim 18, wherein at least one of the microphone arrays of the plurality of nodes moves relative to the other microphone arrays during the digitizing of the acoustic signals.

23. The system of claim 22, wherein the estimating of the spatial parameters further comprises compensating for motion using a space-time statistical model.

24. The system of claim 18, wherein at least one microphone array of the plurality of nodes comprises a different number of microphones than another microphone array of the plurality of nodes.

25. The system of claim 18, wherein the processor is further configured to select a source signal to isolate a single source from the plurality of sources.

26. The system of claim 18, wherein the processor is further configured to filter the digitized acoustic signals to reduce a volume or the contribution of at least one diffuse noise source.

27. The system of claim 18, wherein the estimating the plurality of time-varying source spectra is performed at one of the nodes in the plurality of nodes and wherein the processor is further configured to transmit the plurality of time-varying source spectra from the one of the nodes in the plurality of nodes to all or a subset of other nodes in the plurality of nodes.

28. The system of claim 18, wherein the estimating the plurality of time-varying source spectra is performed at each or at a subset of the nodes in the plurality of nodes.

29. The system of claim 18, wherein the processor is further configured to combine the estimated source signals to result in at least one combination of the source signals.

30. The system of claim 29, wherein the combining results in a plurality of different combinations of the source signals.

31. The system of claim 18, wherein one or more nodes of the plurality of nodes comprise a microphone array having a plurality of synchronous microphones.

32. A method for separating sound sources at a node of a plurality of nodes on a network, the method comprising:
    digitizing acoustic signals from a plurality of sources with a microphone array, wherein the microphone array comprises one or more microphones;
    estimating spatial parameters of the digitized acoustic signals;
    exchanging first data between the node and at least one other node of the plurality of nodes on the network;
    estimating a plurality of time-varying source spectra for the plurality of sources from the digitized acoustic data as a function of the digitized acoustic signals from all microphone arrays of the plurality of nodes; and
    estimating source signals for each or for a subset of the plurality of sources by filtering the digitized acoustic signals digitized at the node using the spatial parameters of the digitized acoustic signals and the plurality of time-varying source spectra.

33. The method of claim 32, wherein the microphone array is asynchronous to another microphone array of another node on the network.

* * * * *